United States Patent [19]

Nusbickel et al.

[11] Patent Number: 5,642,151
[45] Date of Patent: Jun. 24, 1997

[54] DISTRIBUTION OF TELEVISION SIGNALS TO WORKSTATIONS

[75] Inventors: Wendi L. Nusbickel, Delray Beach; Ira H. Schneider, Boca Raton, both of Fla.

[73] Assignee: International Business Machines Corporation, Armonk, N.Y.

[21] Appl. No.: 150,947

[22] Filed: Nov. 12, 1993

[51] Int. Cl.⁶ .................................................. H04N 7/173
[52] U.S. Cl. ........................... 348/6; 348/8; 348/12; 455/3.1; 455/5.1
[58] Field of Search ................................. 348/6, 12, 13, 348/7, 14, 15, 16, 17; 455/4.1, 4.2, 5.1, 6.1; 370/124, 123, 85.5; 395/200.01, 200.02, 200.03, 200.04, 200.05, 200.08, 200.09, 200.12; H04N 7/16, 7/173

[56] References Cited

U.S. PATENT DOCUMENTS

| | | | |
|---|---|---|---|
| 4,450,477 | 5/1984 | Lovett | 348/7 |
| 4,564,940 | 1/1986 | Yahata | 370/124 |
| 4,675,866 | 6/1987 | Takumi et al. | 370/124 |
| 4,829,372 | 5/1989 | McCalley et al. | 348/12 |
| 4,885,747 | 12/1989 | Foglia | 348/8 |
| 4,920,432 | 4/1990 | Eggers et al. | 348/1 |
| 4,935,953 | 6/1990 | Appel et al. | 379/53 |
| 4,947,429 | 8/1990 | Bestler et al. | 348/3 |
| 4,985,888 | 1/1991 | Madge et al. | 370/85.5 |
| 5,014,125 | 5/1991 | Pocock et al. | 348/7 |
| 5,043,938 | 8/1991 | Ebersole | 364/900 |
| 5,130,792 | 7/1992 | Tindell et al. | 348/13 |
| 5,218,714 | 6/1993 | Ishibashi et al. | 348/6 |
| 5,255,267 | 10/1993 | Hansen et al. | 370/85.1 |
| 5,262,875 | 11/1993 | Mincer et al. | 348/6 |
| 5,283,789 | 2/1994 | Gunnarsson et al. | 348/6 |
| 5,357,276 | 10/1994 | Banker et al. | 348/7 |
| 5,359,367 | 10/1994 | Stockill | 348/552 |
| 5,365,264 | 11/1994 | Inoue et al. | 348/12 |
| 5,367,330 | 11/1994 | Haave et al. | 348/7 |
| 5,371,532 | 12/1994 | Gelman et al. | 348/13 |
| 5,374,952 | 12/1994 | Flohr | 348/12 |
| 5,434,610 | 7/1995 | Loveless | 348/6 |
| 5,497,502 | 3/1996 | Castille | 348/7 |

OTHER PUBLICATIONS

Television Engineering Handbook, 1986, K. Blair Benson, McGraw Hill.

*Primary Examiner*—John K. Peng
*Assistant Examiner*—Chris Grant
*Attorney, Agent, or Firm*—Jeffrey S. LaBaw; Andrew J. Dillon

[57] ABSTRACT

Digital video data (such as full motion video and audio) is distributed over a computer network to workstations by an analog video server. The network carries digital network signal traffic. The analog video server retrieves video data from a storage device. The analog video server then decompresses the digital data and converts it into an analog signal. The analog signal is shifted to a bandwidth (such as television channels) that is different from the bandwidth of the network signal traffic, and then combined with the network signal traffic to be distributed over the network. At a workstation, the analog signal is split off of the network signal traffic and provided to a display. Plural workstations can display the same analog signal. Schedules for broadcast times are provided on the network to the workstations. Plural channels in the analog signal bandwidth can be utilized to simultaneously broadcast plural analog signals to the workstations.

4 Claims, 5 Drawing Sheets

DISTRIBUTION OF TELEVISION SIGNALS TO WORKSTATIONS

TECHNICAL FIELD OF THE INVENTION

The present invention relates to methods and systems for providing video and audio, and in particular full motion video, to workstations or computers.

BACKGROUND OF THE INVENTION

Multimedia application programs for workstations or computers are becoming more widespread. An example of a multimedia application program is the provision of full motion video to a workstation display and synchronized audio to workstation speakers.

A tremendous amount of storage is required for full motion video. A common technique for reducing the amount of storage requirements for video files is to compress the video data. The video data is then decompressed before being displayed. But even with data compression techniques, the amount of storage required for full motion video is very large. For example, using a particular type of compression and decompression technology referred to in the industry as digital video interactive, a typical data file contains about 9 megabytes of data for every 60 seconds of playback time.

One way to avoid having full motion video data files take up too much storage space on an individual workstation is to utilize a digital video server. Referring to FIG. 1, the digital video server 11 services plural workstations 13 that are connected to a token-ring local area network 15. The server 11, which is a high performance file server, accesses a data storage device 17, such as a hard disk drive. The compressed data files are stored on the data storage device 17 and transferred over the network in the compressed format. Each workstation 13 on the local area network (LAN) 15 has a display and speakers. In addition, each workstation 13 has a display adapter 19 that decompresses the video data for display on the workstation display. One type of display adapter is known as the Action Media II display adapter, available from IBM (IBM is a registered trademark of International Business Machines Corporation).

To access stored video data files, a workstation 13 sends a request along the network to the digital video server 11. The digital video server 11 retrieves the digital data file from the storage device 17 and sends it digitally on the LAN 15 to the requesting workstation.

The digital video server system described above suffers from several disadvantages. First, the LAN 15 presents a bottleneck to the distribution of video data to a large number of workstations. For example, in order to sustain full motion video at each workstation, the file server and token-ring network must deliver data to each workstation at a sustained rate of about 1.2 megabits per second (utilizing digital video interaction compression technology). We have determined experimentally that it is possible to sustain 10 simultaneous full motion video applications running on a 16 megabit per second token-ring network, while still leaving some bandwidth on the network to support other network traffic. However, a network may have more than 10 workstations that wish to simultaneously use full motion video data files.

There is currently no satisfactory method to ensure that video data can be delivered to each workstation at a constant, required (or guaranteed) rate. Successful operation depends on either limiting the number of video data enabled workstations on the network to a serviceable amount or limiting the number of simultaneous video applications by an informal agreement among workstation users.

A second disadvantage to the prior art digital video server is that video data file retrieval efforts are often duplicated, thereby effectively reducing the video capacity of the network. For example, if two or more workstations wish to simultaneously view the same video data file, then the digital video data file is retrieved twice or more and provided separately to each requesting workstation. Thus, two or more data streams of the same video data file may be simultaneously provided on the network to the requesting workstations. This duplication results in inefficiencies and in taking up valuable network capacity.

A third disadvantage to the prior art video digital server is that each workstation must contain a display adapter for decompressing the video data. These type of adapters are relatively expensive and thus add to the cost of providing full motion video to a number of workstations.

SUMMARY OF THE INVENTION

It is therefore an object of the present invention to provide a video server that provides a greater capacity for providing video data to workstations.

It is a further object of the present invention to provide a video server that provides a single video data file to plural workstations.

It is a further object of the present invention to reduce the expense of video systems.

The method and system of the present invention distribute digital video data to workstations over a network. The network communicatively links the workstations to each other and to a video source. The network carries digital network signals. The digital video data is converted into an analog television signal. The television signal is broadcast to the workstations over the network. The broadcast television signal is received at one of the workstations and is displayed.

In accordance with one aspect of the present invention, before the digital video data is converted into an analog television signal, the digital video data is retrieved from storage and is decompressed.

In accordance with another aspect of the present invention, the digital video data is converted into a very high frequency (VHF) or an ultrahigh frequency (UHF) television signal.

In accordance with another aspect of the present invention, the television signal is broadcast to the workstations over the network by multiplexing the television signal with the network signals and transmitting the television and the network signals over a cable.

In accordance with another aspect of the present invention, the digital video data comprises first video data and second video data. The first video data is converted into a first analog television signal at a first frequency. The second video data is converted into a second analog television signal at a second frequency. The first and second television signals are simultaneously broadcast over the network to the workstations. Either the first television signal or the second television signal is displayed at a workstation.

In still another aspect of the present invention, the broadcast television signal is received at a second workstation, wherein the television signal is displayed at the second workstation.

The present invention enlarges the capacity of a network carrying video data by shifting the video data to a bandwidth that is different from the bandwidth utilized by network signal traffic. The shift in bandwidth is accomplished by converting the digital video data to analog signals and shifting the analog signals to the desired bandwidth.

The analog signals are then broadcast to the workstations over the network. The analog signals are combined onto the network cable at a first location (usually near the video source) and then split off from the network cable at a second location (usually near each workstation). The analog signals are broadcast over the network independently of the network signal traffic, wherein plural workstations on the network can simultaneously access the same analog signal. Thus, if two workstations request the same video data, then the video data is set only once over the network. Plural analog signals can be simultaneously broadcast over the network by utilizing plural channels.

In addition, the costly decompression and processing equipment needed for video data is centrally located at the server, instead of being located at each workstation, thereby reducing the cost of providing video capability.

DESCRIPTION OF THE INVENTION

Figure 2:
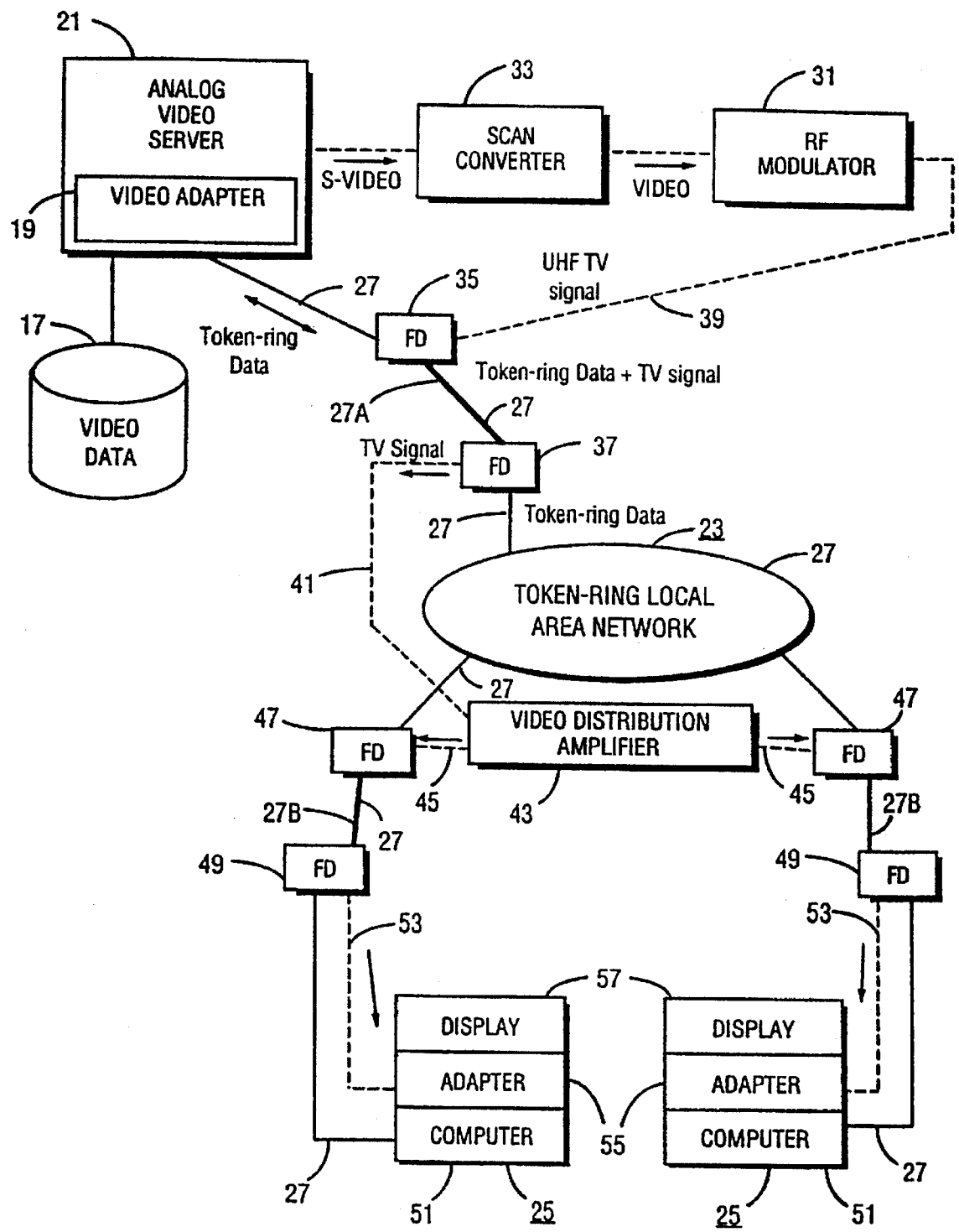
FIG. 2 is a schematic diagram of the analog video server system of the present invention, in accordance with a preferred embodiment, which services a local area network and workstations.

The analog video server system of the present invention transmits analog video data, such as full motion video, over a network. Referring to FIG. 2, there is shown a schematic diagram of the analog video server system of the present invention, in accordance with a preferred embodiment. The analog video server system includes an analog video server 21, an RF modulator 31 and filtering devices 35, 37, 47, 49. The analog video server 21 receives requests for video data that are sent by the workstations 25. Acting upon a request, the analog video server 21 retrieves the video from storage. The analog video server then converts the video data into an analog signal. Then, the RF modulator 31 forms a television signal from the analog signal. The television signal is of a different frequency bandwidth than the digital signals on the network. The filtering devices 35, 37, 47 and 49 first combine the television signal with network signals on the network and then split the television signal off for display at a workstation.

The analog video server system is part of a network that includes a token-ring local area network (LAN) 23, plural workstations 25 and a cable 27 connecting the network components together. The LAN 23 is conventional and includes an access unit (not shown), such as the IBM 8228 Multi-station access unit or the IBM 8230 Controlled access unit.

Each one of the workstations 25 includes a computer 51, a display 57, and a keyboard (not shown). Each computer 51 has a central processing unit, such as an 80386 or 80486 integrated circuit, internal memory (in the form of read only memory (ROM) and random access memory (RAM)), storage devices, such as a hard disk drive and a floppy disk drive, an internal bus and input/output interfaces. The computer 51 has operating system software. In addition, each workstation computer includes a printed circuit network card and software for communicating with the network.

The cable 27 connects the various components of the network together. The cable contains both an aluminum foil shield and a mesh shield. This shielding enables the cable 27 to accommodate the simultaneous transmission of broadband and baseband signals.

The analog video server system includes a storage device 17 such as one or more high speed hard disk drives. The video data files are stored on the storage device. Whenever large data streams (such as video, still image and audio) are managed over a network or stored on disk, those data streams are compressed in order to be more manageable. In the preferred embodiment, the data files are stored using digital compression techniques known in the industry as digital video interactive techniques (developed by IBM and Intel Corporation). However, the present invention can be used with other types of compression techniques.

The analog video server 21 accesses the data files from the storage device 17. The analog video server 21 includes a conventional file server. The conventional file server contains a computer 51 with network hardware (such as a network printed circuit card) and software. The file server contained within the analog video server 21 is substantially similar to the digital video server 11 of FIG. 1.

The analog video server 21 contains, in addition to the file server, a video or display adapter 19. The video adapter 19 accepts the compressed video data files that are retrieved off of the storage device 17 and decompresses those files to form an analog signal. The specific analog signal used in the preferred embodiment is an S-VHS video signal. This type of signal is suitable for use by standard video devices such as video casette recorders and televisions.

The video adapter 19 is a printed circuit card that is located within the analog video server 21 and that communicates with other components within the server by way of a bus (such as an ISA bus or a MICRO CHANNEL bus) (MICRO CHANNEL is a registered trademark of International Business Machines Corporation). The video adapter can provide up to 30 frames per second of motion video and audio. The video adapter provides video processing (using an Intel i82750 PB and DB integrated circuit chip set and video random access memory (VRAM)) and audio processing (using a digital signal processor (DSP)). In the preferred embodiment, the video adapter 19 is a conventional unit referred to Action Media II and is commercially available from IBM.

Figure 1:
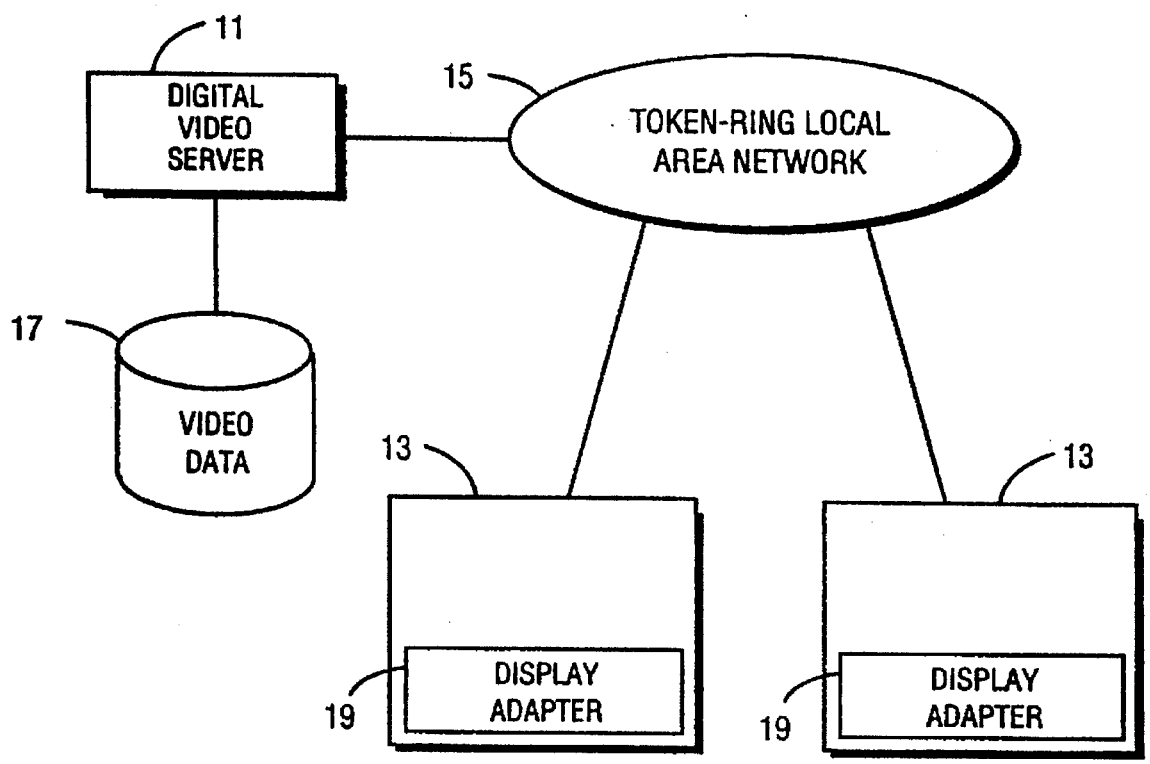
FIG. 1 is a schematic diagram showing a local area network and workstations that are serviced by a prior art digital video server.

The use of the video adapter 19 in the present invention is different than its use in the configuration of FIG. 1. The video adapter 19 provides an analog color video output and sync. In addition, the video adapter has two channels of audio output to amplifiers and speakers. In the prior art configuration described in FIG. 1, there is a video (or display) adapter 19 contained within each workstation 25 that is to receive compressed video files. The analog color video output and sync of the video adapter are connected to the display 57 of the workstation, while the audio outputs of the video adapter are connected to amplifiers and speakers. The S-VHS output of the video adapter 19 is not used in the configuration of FIG. 1.

Referring again to FIG. 2, the S-VHS video signal from the video adapter 19 is converted to an RF TV signal for transmission over the network to the individual workstations 25. An RF modulator 31 is used to convert the analog video signal from the display adapter 19 into a TV signal (either a very high frequency (VHF) or an ultrahigh frequency (UHF) signal). RF modulators 31 are conventional and commercially available. One conventional application of RF modulators is to convert a television into a computer display, wherein the RF modulated computer signals are fed into the antenna inputs of the TV, much as an ordinary TV signal is fed.

In the preferred embodiment, the RF modulator 31 that is used accepts a standard composite video signal as an input, instead of an S-VHS video signal. One difference between an S-VHS signal and a standard composite video signal is the encoding of information. Information such as color and intensity are encoded differently in an S-VHS signal than a standard composite video signal. Therefore, in the preferred embodiment, a scan converter 33 is used to convert the S-VHS video signal from the video adapter 19 into a standard composite video signal suitable for use by the RF modulator 31. Scanning converters 33 are conventional devices. One source for a scan converter is commercially available VHS video cassette recorders.

The output of the RF modulator 31 is connected to the network cable 27 by way of a first filtering device 35. The first filtering device 35 is located physically close to the analog video server 21. The filtering devices are used in pairs. Thus, there is a first filtering device 35 and a second filtering device 37. The first filtering device 35 combines the TV signal onto the network cable 27, while the second filtering device splits the TV signal off of the network cable.

The filtering devices 35, 37 permit simultaneous transmission of baseband and broadband signals on the cable 27. Baseband signals are the network data signals and occupy a lower end of the electromagnetic spectrum than do the broadband TV signals. Typical token-ring LANs 23 operate at either 4 or 16 megabits per second. Broadband signals are the RF TV signals and have a bandwidth of 50–550 Megahertz. The filtering devices utilize frequency division multiplexing techniques and combine (or split) the baseband and broadband signals. The filtering devices isolate the baseband and broadband signals from each other on their respective bandwidths to maintain complete isolation during the transaction (either combining or splitting the signals).

In the preferred embodiment, the specific filtering device that is used is sold under the trademark F-COUPLER by IBM. The filtering device has a coaxial cable input/output for the separate TV signal and two connectors for being serially installed in-line with the cable 27.

The first filtering device 35 is connected to the output of the RF modulator 31 by a coaxial cable 39, and to the analog video server 21 and the LAN 23 by the network cable 27. The first filtering device 35 is upstream (relative to the flow of the TV signal) from the second filtering device 37. The network signals flow in both directions through the filtering devices. The first filtering device 35 combines the TV signal (a broadband signal) with the network signals (the baseband signals). The second filtering device 37 splits the TV signal off of the network signal.

Thus, the TV signal, which contains both audio and video, is transmitted to the workstations 25 on top of the network signals over a section 27A of the network cable 27.

In the preferred embodiment, the TV signal is split off of the network signals before the TV signal reaches the LAN 23. The splitting off occurs at the second filtering device 37. This is done to avoid passing the TV signal through a multistation access unit (not shown), which is unable to accept or pass a TV signal. If a multistation access unit is designed to access or pass a TV signal, or the TV signal is otherwise allowed to be put on the LAN 23, then the TV signal need not be split off and may be transmitted directly on the LAN.

A coaxial cable 41 extends from the second filtering device 37 to a video distribution amplifier 43. The video distribution amplifier 43 amplifies the TV signal, which has experienced attenuation during its transmission along the network. In addition, the video distribution amplifier 43 splits the TV signal for distribution to a number of workstations.

Coaxial cable 45 extends from the output of the video distribution amplifier to respective third filtering devices 47. Each of the third filtering devices 47 combine the TV signal with the network signals that flow between the workstation 25 and the LAN 23. The TV signal is thus transmitted on top of the data signals for a section 27B of the cable 27. The third filtering devices 47 operate in the same way as the first filtering device 35.

At each workstation, a fourth filtering device 49 is used to split off the TV signal from the data signals. The fourth filtering devices 49 operate in the same way as the second filtering device 37. The network cable 27 extends from each fourth filtering device 49 to the computer 51 of the workstation. A coaxial cable 53, carrying the TV signal, extends to a display adapter 55. The adapter 55 converts the TV signal into signals that can be presented on the computer display 57. Thus, a workstation user can view on the display either information from the computer or video from the TV signal.

In the preferred embodiment, the specific adapter 55 that is used is a unit sold under the name PS/2 TV by IBM. The PS/2 TV unit is self contained within a box that is located external of the computer 51. The unit can be physically located beneath the display. The unit contains a 181 channel TV tuner, that accepts signals from a cable TV source or an antenna. The unit has an internal speaker, as well as a headphone jack and a set of audio input/output connectors. The workstation keyboard is connected to the unit instead of to the computer. Thus, the workstation user can select what type of information is to be displayed, namely a full screen computer display (where the user may work with data), a full screen video display (where the user may only watch the display), or a combination of the two referred to as picture-in-picture. With picture-in-picture, a small TV window is displayed within the larger computer display. The unit supports the following types of displays 57: VGA (video graphics adapter) and XGA (extended graphics adapter).

Other types of display adapters 55 can be used, which adapters are printed circuit cards located inside of the computer.

The display adapter 55 provides the full motion video (or other types of video) data and the audio to the display and speakers, respectively. Thus, the workstation user is able to view the video data and hear the synchronized audio.

As an alternative to a display adapter 55, the TV signal can be fed directly into the antenna input of a conventional television set (which of course has a speaker). As mentioned above, the television set can be used as the computer display, wherein an RF modulator converts the display data from the computer 51 into a television signal.

The coupling of analog TV signals to the network cable 27 leaves the network portion of the cable bandwidth unfettered with video data files. This is because the TV signal is of a higher frequency content than the network signals.

Figure 3:
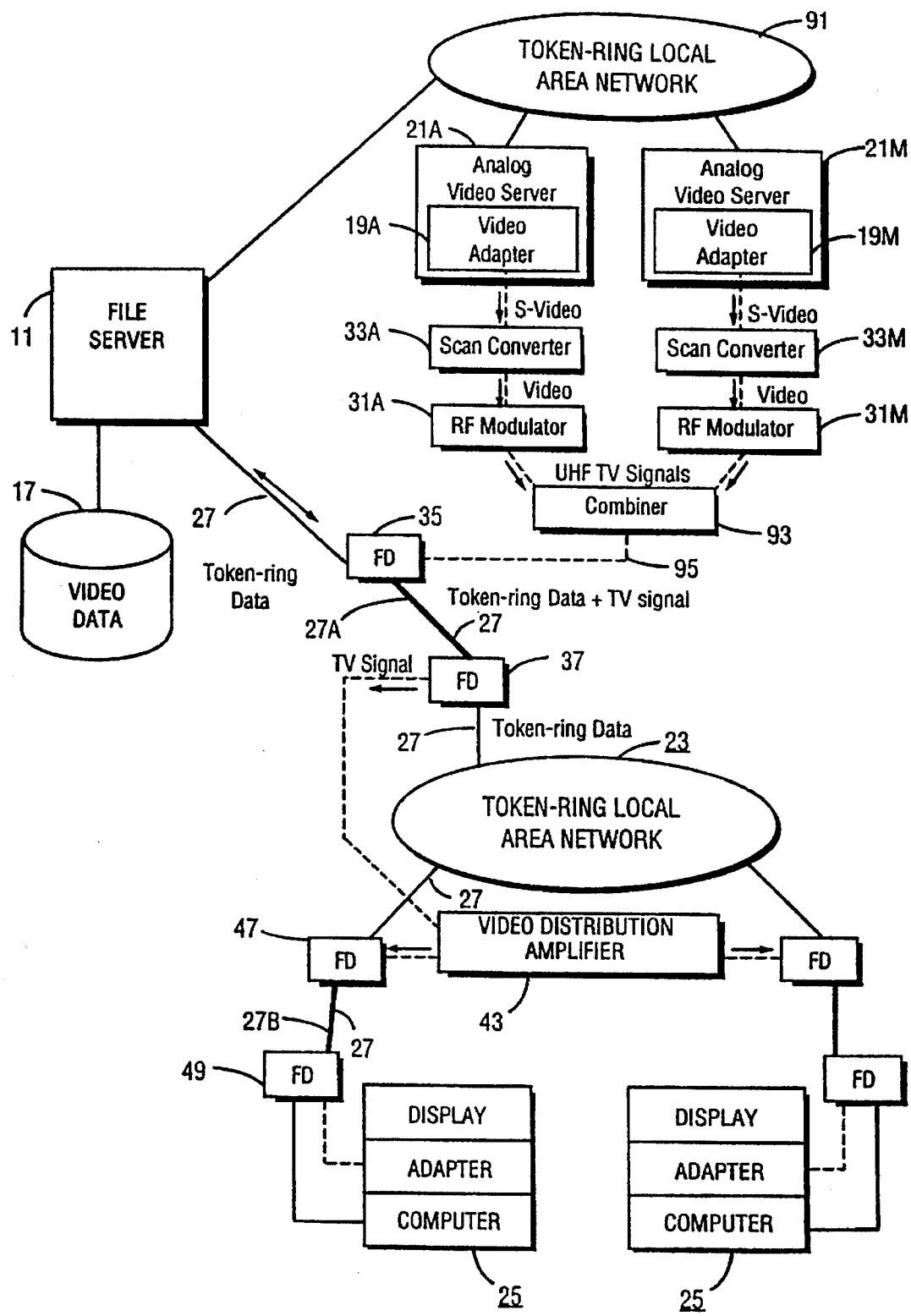
FIG. 3 is a schematic diagram of the analog video server system of the present invention, in accordance with another embodiment.

In FIG. 3, there is shown another embodiment of the analog video server system. In this embodiment, plural TV signals are simultaneously provided to the workstations by way of the cable 27. Each TV signal occupies its own channel. A workstation user can select which station is to be viewed on the workstation display.

The embodiment of FIG. 3 is possible because the available bandwidth for transmitting the TV signal over the cable 27 is typically wide, allowing for plural channels of TV signals to be transmitted.

The embodiment of FIG. 3 utilizes a conventional file server 11 and storage device 17. The file server 11 is the same as the digital video server 11 in FIG. 1. The file server 11, unlike the analog video server 21 of FIG. 2, does not contain a video adapter 19. Instead, there is a video adapter 19A, 19M provided in each one of an M number of analog video servers 21A, 21M. The analog video servers are connected to the file server 11 by a token-ring local area network 91. The output of each analog video server is connected to a scan converter 33A, 33M, which in turn is connected to an RF modulator 31A, 31M. Each analog video server, scan converter and RF modulator set is similar to the analog video server 21, scan converter 33 and RF modulator 31 described with reference to FIG. 2. The individual RF modulators output an RF TV signal on a unique frequency or channel relative to the other RF modulators. For example, a first modulator 31A would provide a TV signal on TV channel 20, while a second RF modulator would provide a TV signal on channel 30, and so on.

The individual TV signals are routed to a conventional and commercially available combiner 93, which combines all of the TV signals onto a single coaxial cable 95. The TV signals are then transmitted to the workstations on the network cable 27, as described above with respect to FIG. 2, using the filtering devices to combine and split the TV signals onto and off of the cable.

Plural file servers 11 and storage devices 17 can be provided to increase the capacity of the analog video server system of either FIGS. 2 or 3.

Figure 4:
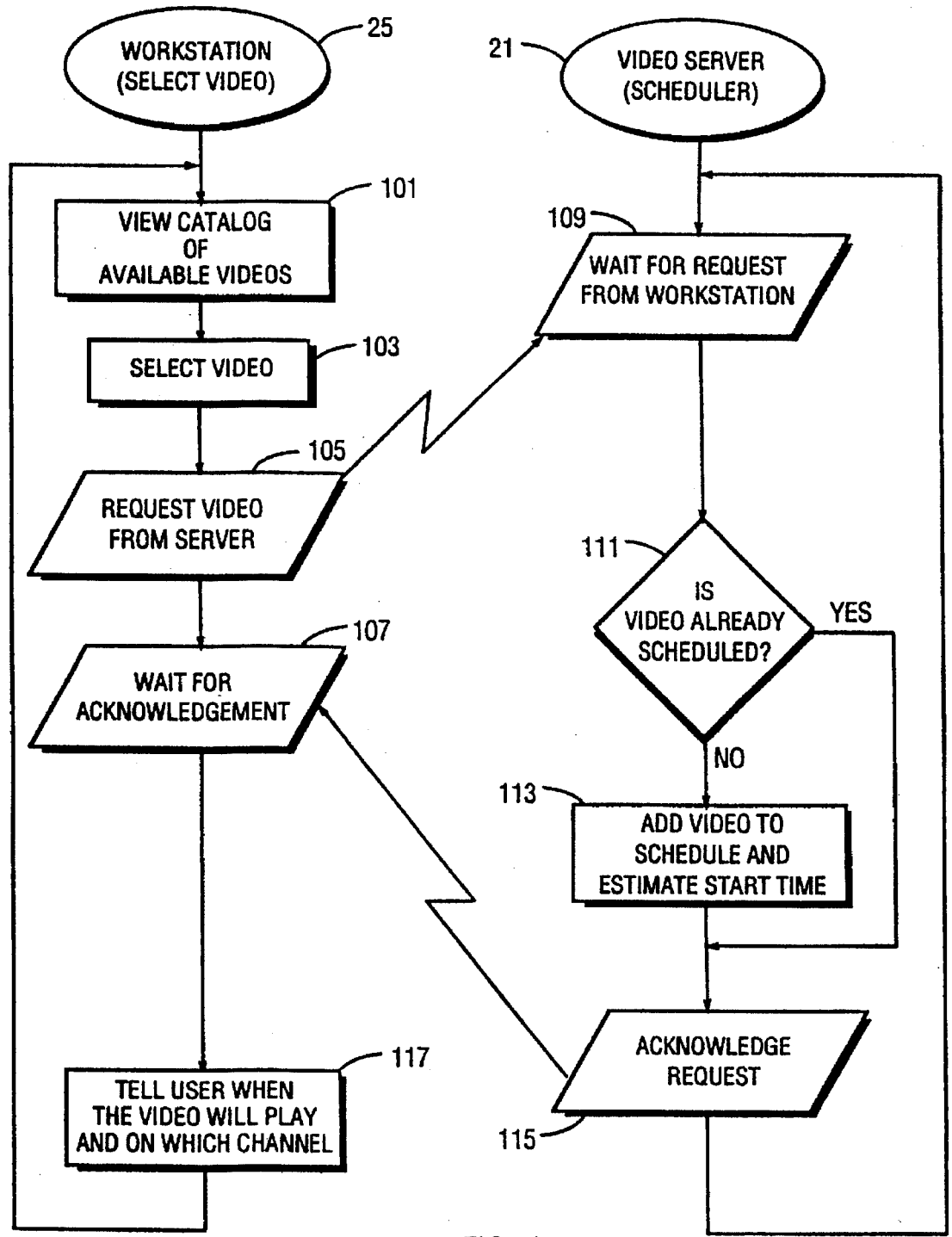
FIG. 4 is a flow chart showing a method for a workstation to request a video data file from the analog video server.
Figure 5:
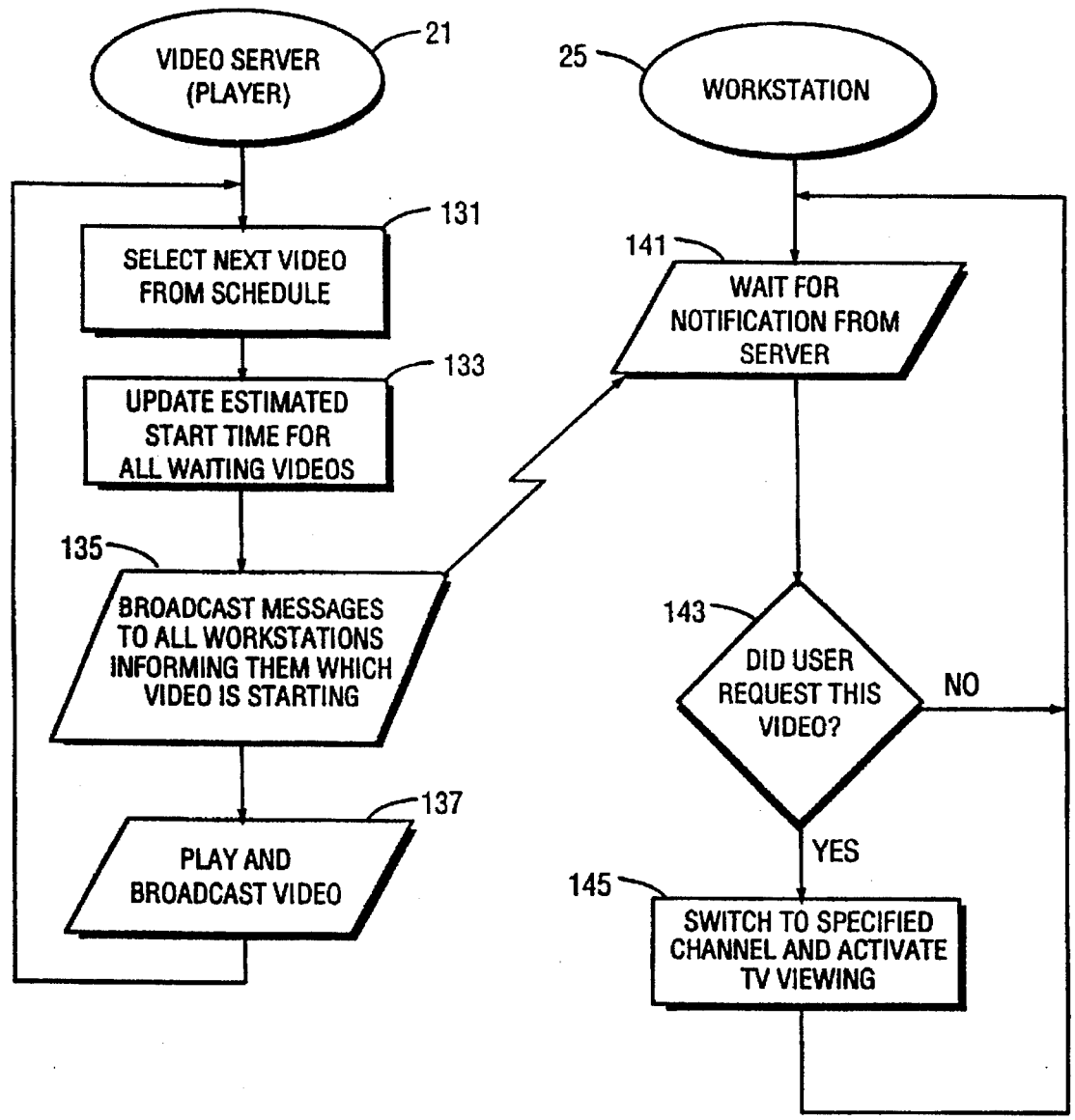
FIG. 5 is a flow chart showing a method for the analog video server to broadcast a video to workstations.

A workstation user can request that the analog video server system provide a specific video data file on the network for access by the user. The flow chart of FIG. 4 illustrates a method for requesting specific video data files. The flow chart of FIG. 5 illustrates a method for playing video data files on the network. In the flow charts of FIGS. 4 and 5, the following graphical conventions are observed: a rectangle for a process or function, a diamond for a decision and a parallelogram for an input/output function. These conventions are well understood by programmers skilled in the art of computers and the flow charts are sufficient to enable a programmer skilled in the art to write code in any suitable computer programming language, such as PASCAL or C for a computer such as the IBM Personal System /2 (PS/2) family of computers which supports these languages. (PS/2 is a trademark of International Business Machines Corporation.)

Referring now to FIG. 4, there are shown two separate, yet related, flow charts. The leftmost flow chart is executed by an individual workstation 25. The rightmost flow chart is executed by the analog video server 21. The workstation 25 flow chart will be described first. In step 101, the workstation displays, and the user views, a catalog of video data files or other sources of video. In step 103, a specific video is selected by the user. In step 105, a request for the selected video is transmitted to the analog video server 21 from the user's workstation 25. The request takes the form of a conventional network communication between a workstation and a server and is communicated on the cable 27 (see FIG. 2). After transmitting the request, the workstation 25 waits for an acknowledgement, step 107.

At the analog video server 21, the server waits for a request from a workstation, step 109 (of the rightmost flow of FIG. 4). When the request is received, the server determines if the requested video is already scheduled to be broadcast on the network and the LAN 23, step 111. If the result of step 111 is NO, then the requested video is added to the broadcast schedule and given an estimated start time. The videos are added to the schedule on a first-in, first-out basis. The estimated start time is determined from the number of and estimated playing times for the video data files that are to be broadcast before the requested video. The estimated playing times are determined either from an attribute of the videos or from the amount of data contained in each video. The method then proceeds to step 115. If the result of step 111 is YES, then step 113 is bypassed and the method proceeds to step 115.

In step 115, the workstation request is acknowledged. The acknowledgement takes the form of a conventional network communication between a server and a workstation and is transmitted to the workstation over the network and the LAN 23 by way of the cable 27. The acknowledgment contains information relating to when the requested video will be broadcast and on which channel (if more than one TV channel is being utilized). After step 115, the analog video server method returns to step 109 to await the next request.

Returning to the workstation portion of FIG. 4, when the acknowledgement from the server is received, the workstation method proceeds to step 117. In step 117, the workstation informs the user when the requested video will play and on what channel. This information can be presented on the workstation display.

If the analog video server 21 is not burdened with numerous video requests, then a workstation can view the requested video almost immediately. This would occur when the file server portion of the analog video server 21 is able to retrieve the video data file immediately upon receiving the workstation request.

However, if the file server is busy serving previous video requests, then the requests are queued in the order that they are received. The method of FIG. 5 illustrates the broadcasting of queued requested videos.

In FIG. 5, two related flow charts are shown. The leftmost flow chart is executed by the analog video server 21. The rightmost flow chart is executed by the individual workstations 25.

The server flow chart of FIG. 5 will be described first. In step 131, the next video is selected from the schedule. This video was added to the schedule in step 113 of FIG. 4. In step 133 of FIG. 5, the estimated start times for all of the videos waiting to be broadcast are updated based on actual playing times of videos already broadcast. In step 135, a message is broadcast to all workstations 25. The message informs the workstation users that a specific video (which is identified) is starting and on which channel the video will be broadcast on. The message is communicated as a network signal. In step 137, the server 21 plays and broadcasts the video as a TV signal. After step 137, the method returns to step 131 to get the next scheduled video.

Referring to the rightmost flow of FIG. 5, in step 141, the individual workstation waits for notification from the analog video server 21. When a notification message is received, then the method proceeds to step 143. In step 143, the method determines if the user requested the video that is about to be broadcast. If the result of step 143 is YES, then in step 145, the method automatically switches the display adapter 55 (see FIG. 2) to the specified channel and activates TV viewing by routing the TV signal to the display 57. After step 145, the method returns to step 141. If the result of step 143 is NO, then the method bypasses step 145 and returns to step 141.

The present invention eliminates the need for providing a video or display adapter (that decompresses video data files) in each workstation. Instead, the decompression of video data files occurs at the analog video server 21. Thus, only one video adapter 19 is required. Once decompressed, the video data files now require a large digital data capacity to be transmitted over the network. The present invention converts the decompressed video data files into analog signals suitable for conversion to a TV signal. The TV signal occupies a different bandwidth than does the network signals. Thus, the TV signal can be transmitted over the network without interfering with the network signals, thereby resulting in an increase in data carrying capacity for the network and the LAN 23.

Because the TV signals are broadcast on the network independently of any network signals, any network user can access the TV signals, much like on a cable TV network. Thus, the file server does not duplicate its work by simultaneously providing the same video twice to two workstation users.

The foregoing disclosure and the showings made in the drawings are merely illustrative of the principles of this invention and are not to be interpreted in a limiting sense.

What we claim is:

1. A system for distributing video data to workstations over a computer network, said system comprising:
   a first local area network;
   a file server for accessing a plurality of diverse digital video data files and for distributing said plurality of diverse digital video data files over said first local area network;
   a plurality of video servers coupled to said first local area network, each of said plurality of video servers including means for converting a digital video data file into an analog television signal;
   combiner means coupled to said plurality of video servers for combining a plurality of analog television signals;
   a second local area network carrying digital network signals, said second local area network coupled to said combiner means; and
   a plurality of workstations, each comprising a digital computer and a display coupled to said digital computer, each workstation coupled to said second local area network for receiving and displaying a selected one of said plurality of analog television signals.

2. A system for distributing video data to workstations over a computer network according to claim 1 further including means for displaying at least some of said digital network signals on said display of each workstation.

3. A system for distributing video data to workstations over a computer network according to claim 1 wherein said means for converting a digital video data file into an analog television signal comprises an RF modulator.

4. A method of distributing video data and digital network signals to a plurality of workstations over a computer network, said computer network comprising a plurality of workstations, each workstation comprising a digital computer and a display coupled to said digital computer, said digital network signals being sent over said network in a first bandwidth, said method comprising the steps of:
   accessing a plurality of diverse digital video data files and coupling said plurality of diverse digital data files to a first local area network;
   converting each digital video data file into an analog television signal utilizing one of a plurality of video servers coupled to said first local area network, said analog television signal occupying a second bandwidth, said second bandwidth being separate from said first bandwidth;
   combining a plurality of analog television signals from multiple ones of said plurality of video servers;
   coupling said combined plurality of analog television signals to a second local area network having a plurality of workstations coupled thereto;
   separating said analog television signals from said digital network signals;
   displaying a selected analog television signal on a display of one of said workstations; and
   displaying at least some of said digital network signals on said display of said one workstation.

* * * * *